United States Patent [19]
Conley et al.

[11] Patent Number: 5,638,456
[45] Date of Patent: Jun. 10, 1997

[54] PIEZO SPEAKER AND INSTALLATION METHOD FOR LAPTOP PERSONAL COMPUTER AND OTHER MULTIMEDIA APPLICATIONS

[75] Inventors: John K. Conley, Linthicum; William Kokonaski, Columbia, both of Md.; Michael J. Parrella, Weston, Conn.; Steven L. Machacek, Alexandria, Va.

[73] Assignee: Noise Cancellation Technologies, Inc., Linthicum, Md.

[21] Appl. No.: 267,218

[22] Filed: Jul. 6, 1994

[51] Int. Cl.⁶ .................................................. H04R 25/00
[52] U.S. Cl. .................... 381/190; 381/88; 381/152; 381/158; 181/141; 181/148; 181/153; 181/199
[58] Field of Search ............................ 381/190, 188, 381/88, 158, 99, 152, 151; 181/199, 153, 148, 141, 144

[56] References Cited

U.S. PATENT DOCUMENTS

| | | |
|---|---|---|
| 3,423,543 | 1/1969 | Kompanek . |
| 3,548,116 | 12/1970 | Schafft . |
| 3,786,202 | 1/1974 | Schafft . |
| 4,079,213 | 3/1978 | Bage et al. . |
| 4,127,749 | 11/1978 | Atoji et al. ............................ 381/158 |
| 4,348,552 | 9/1982 | Siccone ................................ 381/99 |
| 4,352,961 | 10/1982 | Kumada et al. . |
| 4,368,401 | 1/1983 | Martin et al. . |
| 4,401,857 | 8/1983 | Morikawa ............................ 381/190 |
| 4,439,640 | 3/1984 | Takaya ................................ 310/321 |
| 4,481,663 | 11/1984 | Spranger ............................. 381/190 |
| 4,779,246 | 10/1988 | Dietzsch et al. . |
| 4,817,152 | 3/1989 | Lee ..................................... 381/190 |
| 4,931,950 | 6/1990 | Isle et al. ............................ 364/513 |
| 5,073,946 | 12/1991 | Satoh . |
| 5,347,630 | 9/1994 | Ishizawa et al. ................... 395/164 |
| 5,400,414 | 3/1995 | Thiele ................................. 381/190 |

Primary Examiner—Curtis Kuntz
Assistant Examiner—Duc Nguyen
Attorney, Agent, or Firm—Daniel DeJoseph

[57] ABSTRACT

This application outlines several applications of a piezoelectric materials invention to produce quality loudspeakers in applications where coil driven dynamic speakers are difficult or impossible to implement with an appreciable degree of sound quality. This invention includes a series of modifications to a laptop computer such as the IBM 750c. The modifications to the computer consist of placing piezoelectric patches behind the LCD and directly to the back wall of the laptop lid. Damping materials and stiffeners are also added to the back wall to reduce structural resonance. A system consisting of an audio amplifier and transformer is used to drive the piezo speaker.

18 Claims, 12 Drawing Sheets

PIEZO SPEAKER AND INSTALLATION METHOD FOR LAPTOP PERSONAL COMPUTER AND OTHER MULTIMEDIA APPLICATIONS

This application outlines several applications of a piezoelectric materials invention to produce quality loudspeakers in applications where coil driven dynamic speakers are difficult or impossible to implement with an appreciable degree of sound quality. This invention includes a series of modifications to a laptop computer such as the IBM 750c. The modifications to the computer consist of placing piezoelectric patches behind the LCD and directly to the back wall of the laptop lid. Damping materials and stiffeners are also added to the back wall to reduce structural resonance. A system consisting of an audio amplifier and transformer is used to drive the piezo speaker. The electronics are packaged so that they fit in the space of the 3.5 inch disk drive. The audio circuitry module has quick disconnects and can be easily removed when not in use. Other applications include light weight speakers made from plastic and/or foam, small radios, tape and compact disc players. A stereo speaker system is also discussed that utilizes reflection from the walls of a corner to enhance separation.

BACKGROUND ART

In many applications that require a sound source, such as multimedia PC's, size and power consumption are critical. Size and power consumption are of even greater concern in portable, battery driven devices. Conventional loudspeakers, while able to reproduce sound well, require a large amount of space and are an inefficient way to convert electrical power into acoustical power. Space requirements are not easily reduced because of the need for a moving coil to drive the diaphragm. Piezoelectric loudspeakers have been proposed as a diaphragm as an alternative to moving coil loudspeakers. Such a device was described by Martin in U.S. Pat. No. 4,368,401 and later by Takaya in U.S. Pat. No. 4,439,640. Both inventions dealt with attaching a disc shaped piezo to a diaphragm. Martin's device used a thick glue layer (10 to 50% of the carrier plate thickness) between a carrier plate and the piezo ceramic. The adhesive layer served to attenuate resonance. Takaya accomplishes the same through use of a film with a smaller Q factor than the diaphragm. Both inventors specify disc shape diaphragms and piezoceramic plates. Kompanek in U.S. Pat. No. 3,423,543 uses a plurality of ceramic wafers made of piezoelectric materials such as lead zirconate-lead titanate mixtures of various shapes. Conductive layers are affixed to both sides of the wafer and then glued to a flat plate. Kompanek states that the plate is preferably made of a conductive metal such as steel but may be of plastic or paper with a conductive layer thereon forming the surface. Another such device in Kumada, U.S. Pat. No. 4,352,961 attempts to improve the frequency response further by using various shapes for the diaphragm, such as an ellipse. He also claims the ability to form the speaker from transparent piezoceramic materials such as lanthanum doped zirconium titanate (PZT) so that the speaker can be used in applications such as watch covers and radio dials. He also uses a bimorph to drive the diaphragm rather than a single layer of ceramic. All of the above methods use a flat panel driven by a piezo ceramic device and make no attempt to use a three dimensional structure to improve the sound quality. The diaphragm must be attached to some type of frame and clamped to the frame. Bage, Takaya and Dietzch in U.S. Pat. No. 4,779,246 all discuss methods of attaching the diaphragm to a support frame. Early efforts used piezo ceramics to drive conical shapes reminiscent of those found in loudspeakers. Such devices can be found in Kompanek in U.S. Pat. No. 3,423,543 and Schaffi, U.S. Pat. Nos. 3,548,116 and 3,786,202. Schaffi discusses building a device suitable for use in loudspeakers. This device is of much greater complexity than flat panel speakers and is not suitable for applications where a low profile speaker is needed. In order to constrain the center of the diaphragm from moving, Bage in U.S. Pat. No. 4,079,213 uses an enclosure with a center post. He claims that this reduces the locus of nodal points to the location of the centerpost and therefore improves the frequency response of the device. The enclosure is used to support the centerpost and has openings to provide for pressure relief, and does not improve the acoustic performance. Thin speakers were discussed in U.S. Pat. No. 5,073,946 by Satoh et al, which included the use of voice coils.

BRIEF DESCRIPTION OF THE INVENTION

In the past, sound reproduction in laptop personal computers has been difficult, if not impossible. Relatively large, cumbersome speakers had to be carried along with the computer. In some cases small dynamic speakers have been used with relatively poor sound quality. Current portable compact disc players are plagued with a similar problem, requiring the use of a headset or amplified speakers.

In one embodiment of the present invention, piezoelectric elements made from PZT are bonded to the back wall of the laptop lid directly behind the LCD of an IBM 750c "thinkpad" personal computer. This effectively converts the laptop lid into an amazingly high quality loudspeaker. Damping material made of plastic coated aluminum sheet is used to reduce variations in the frequency response of the speaker. By converting the lid of the laptop computer, multimedia computing is made much more portable. All of the audio circuitry is contained in a case that fits in the space for the 3.5 inch disk drive in the IBM 750c.

Another embodiment of the present invention includes the use of piezoelectric panel speakers to provide sound in portable compact disc players. The piezo speakers unfold from within the lid of the compact disc player.

In another embodiment of the invention a very light weight speaker is constructed from Styrofoam panels in a variety of shapes and sizes backed with light weight shells made of plastic or cardboard. These light weight speakers can be used as ceiling or wall panels providing music or intercom audio. A retrofit application kit with a built-in audio circuit is also discussed. Styrofoam vibrates well due to its low mass.

In another embodiment of the present invention piezoelectrics are placed inside the wall of two different size hollow triangular boxes made from ⅜" pieces of ABS. The larger box is roughly 8 inches high and 6 inches wide. The other box is roughly 6 inches high and 4 inches wide. The smaller box is placed inside the larger one to create a resonant cavity that provides improved low frequency performance. All sides of the boxes are treated with damping material to reduce variations in frequency response.

In another embodiment stereophonic sound is produced by reflecting sound from the corner of a room using a single triangular shaped box with stereo channels.

DETAILED DESCRIPTION OF INVENTION

Figure 1:
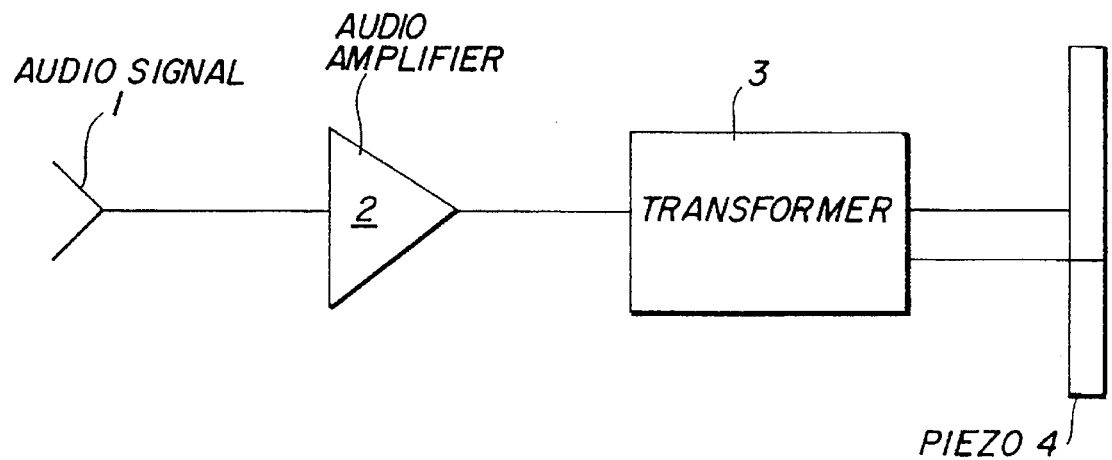
FIG. 1 is a block diagram of the audio circuit.

All speaker systems require some form of amplifier. The present state of the invention utilizes a system illustrated in the block diagram of FIG. 1. The audio signal 1 is fed into a linear amplifier 2 that provides the signal "boost" or amplification. The output of the amplifier 2 is fed into a 17 to 1 transformer 3 to increase the voltage swing at the piezoelectric element 4. This is necessary since the displacement in the piezoelectric is directly related to the applied electrical potential.

Figure 2:
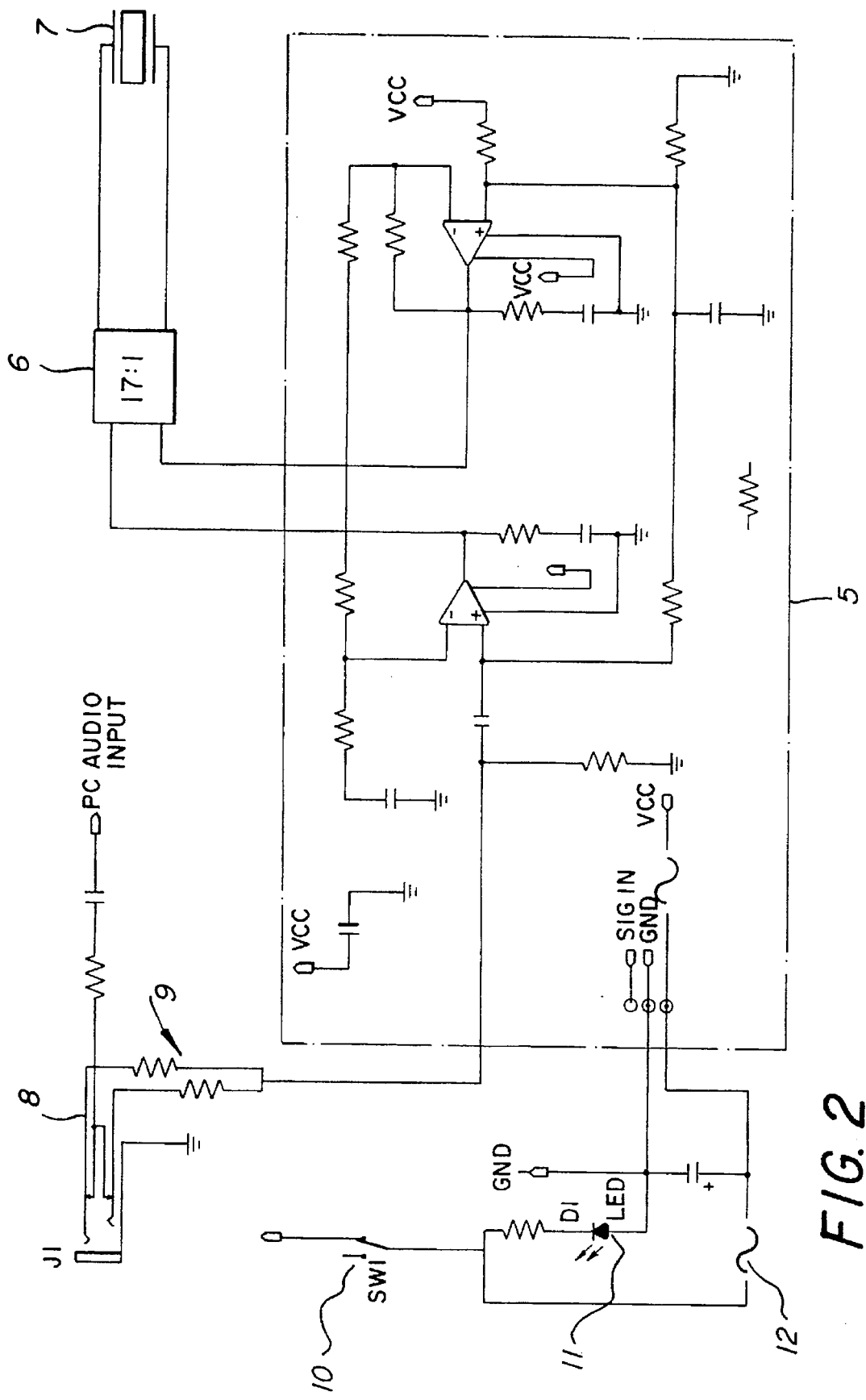
FIG. 2 is a detailed circuit schematic of the audio circuit including the specific details of the laptop installation.

FIG. 2 is a detailed audio circuit that was installed in a laptop IBM 750c which is commercially available. The linear amplifier is assembled on a printed circuit board 5 and consists of two power op-amps and the accompanying resistors and capacitors. The transformer 6 step the voltage up by a factor of 17 before it is applied to the piezoelectric element 7. The audio signal is brought into the system via a 3.5 mm stereo jack 8. In monaural application, as is the case for the present embodiment, the channels are summed together in a low impedance junction 9. A push-on push-off switch 10 is used to turn the audio system power on and off. A green light emitting diode 11 is used to indicate when power is turned on. A 2.5 ampere fuse 12 is placed in line with the power supply to the printed circuit board. This simple circuit is all that is required to drive the piezoelectric speaker system.

The piezos used for the invention are generally those manufactured by Morgan Matroc under Part No. 58667, powder lot 5H with a poling date of Apr. 30, 1993.

The application of the piezo elements to the lid of the laptop is optimized to improve the acoustic quality of the case. Stiffening and damping material are added to remove or minimize as much objectionable resonance as possible. The process is outlined in FIG. 3. The first step is the application of piezoelectric elements 13 to the lid of the laptop. The lid is then driven with a sine sweep 14. If no resonance is detected 15, then the next step is to simply finish the assembly of the lid 16. If resonance is present 15, then the next step is to apply damping material and secure any loose or vibrating elements (screws, nuts, etc.) 17 to the area around the piezoelectric elements. The lid is then once again driven with a sine sweep 18. If no resonance is detected 19, then the next step is to finish the assembly of the lid 16. If resonance is present 19, then the next step is to apply stiffening material 20 to the back wall of the laptop lid. These materials are thin stiff pieces of woven fiber glass/epoxy board roughly 0.04 inches thick. The lid is then once again driven with a sine sweep 21. If no resonance is detected 22, then the next step is to finish the assembly of the lid 16. If resonance is still present 22, then more damping may be applied 17. This process is continued until an acceptable level of sound quality is achieved.

Figure 3:
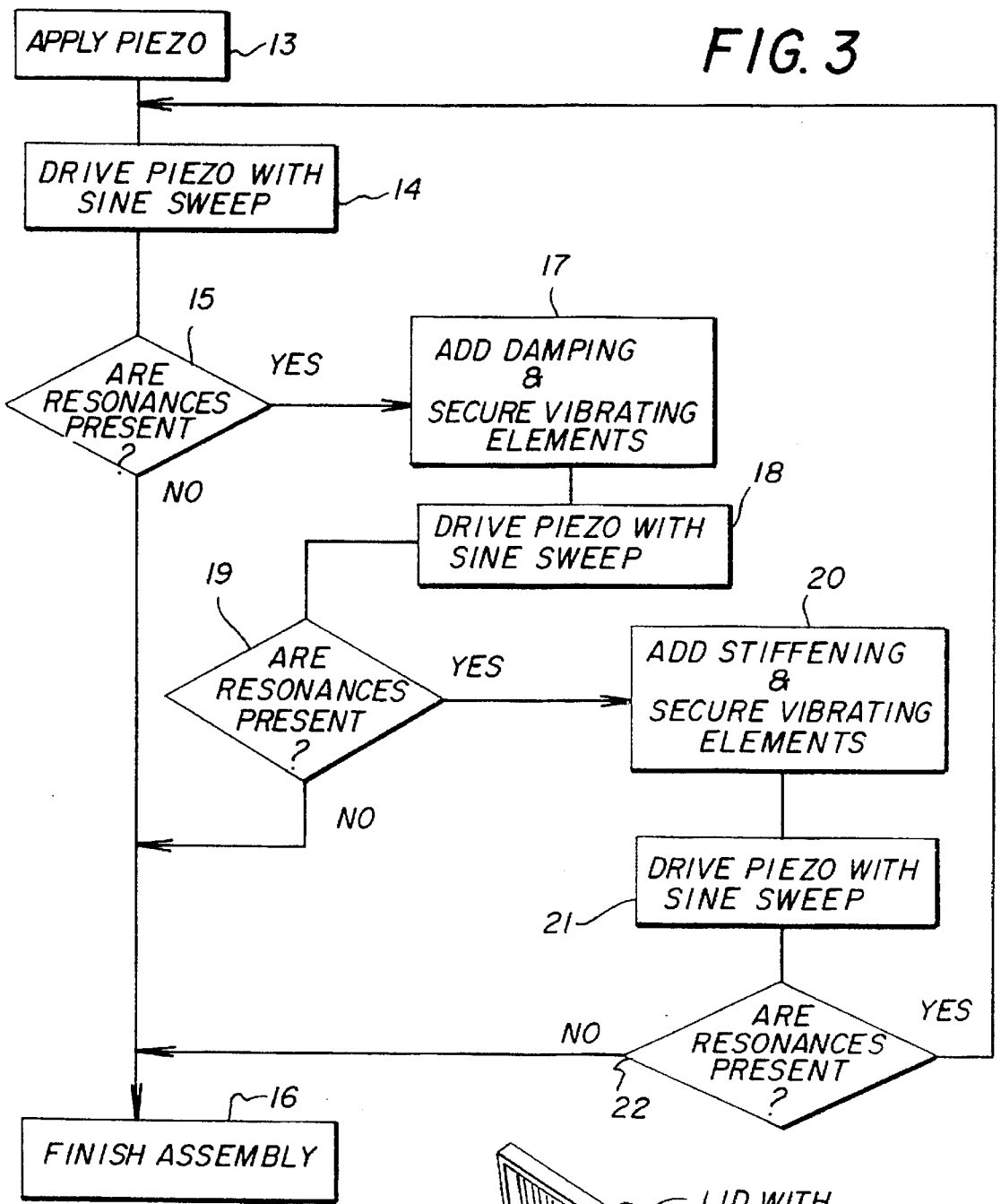
FIG. 3 is a flow chart detailing the optimization process for the laptop application.
Figure 4:
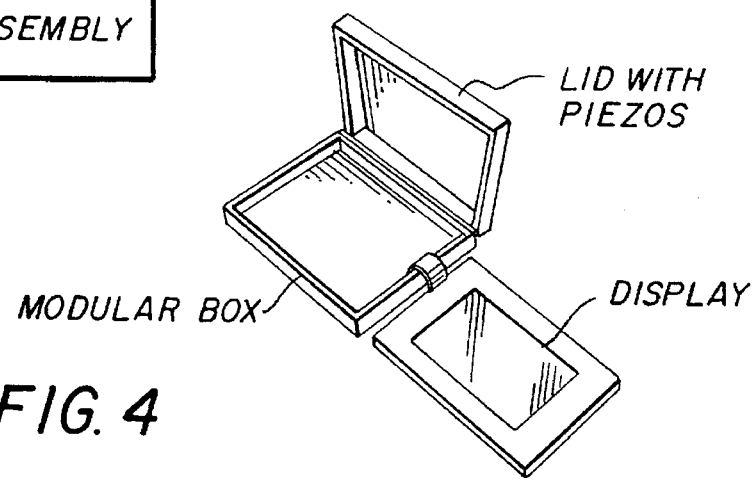
FIG. 4 is a photograph of the disassembled IBM 750c with the display removed temporarily for applying the piezoelectrics and the stiffening and damping material.

FIG. 4 is a photograph of the open lid of the IBM 750c. The display is temporarily removed to facilitate the optimization outlined in FIG. 3.

Figure 5:
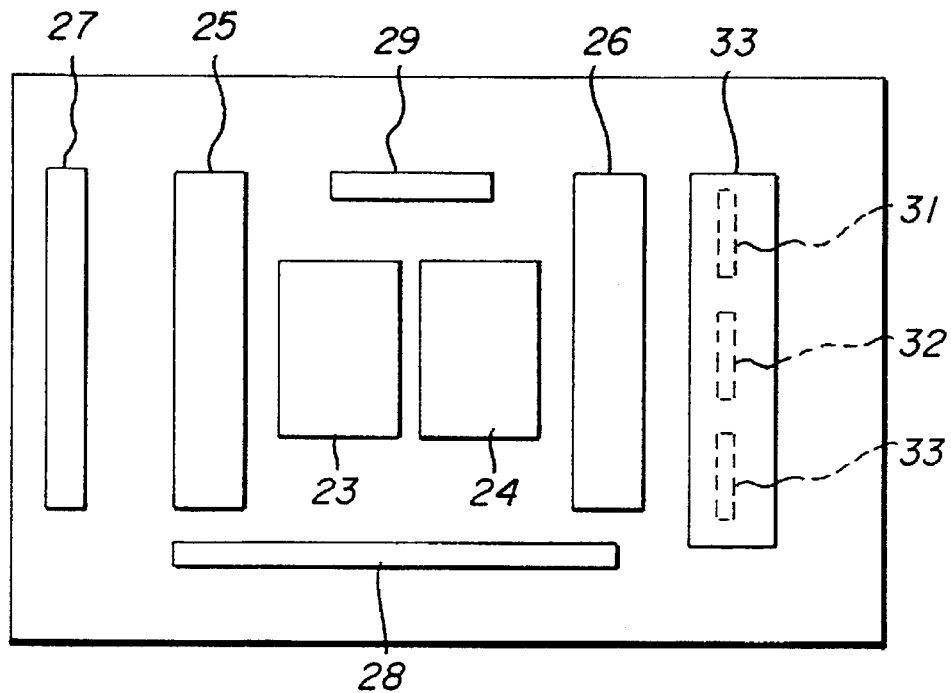
FIG. 5 illustrates the application of the piezoelectrics and the stiffening and damping material to the lid of the laptop.

The process outlined in FIG. 3 on the IBM 750c resulted in the arrangement of piezoelectric elements 23, 24, damping material 25, 26 and 27 and stiffening material 28, 29, 30, 31 and 32 illustrated in FIG. 5. The piezoelectric elements 23, 24 were placed in the center of the back wall of the laptop lid. The piezoelectric elements are bonded to the plastic wall of the laptop lid with LOCTITE™ SPEED BONDER 325 and ACTIVATOR 707 (a catalyst), both commercially available. Wide strips of damping material 25, 26 were placed on each side of the two piezoelectric elements 23, 24. An additional thin strip of damping material 27 was also applied to the far left side of the back wall of the lid. Stiffening members 28, 29 were applied above and below the two piezoelectric elements 23, 24. Smaller pieces of stiffering material 30, 31, and 32 were applied directly behind the display circuit board 33. This process could be automated in the tooling of the plastic case by injection molding thicker regions for stiffness and inserting damping before injection molding of the plastic case.

Figure 6:
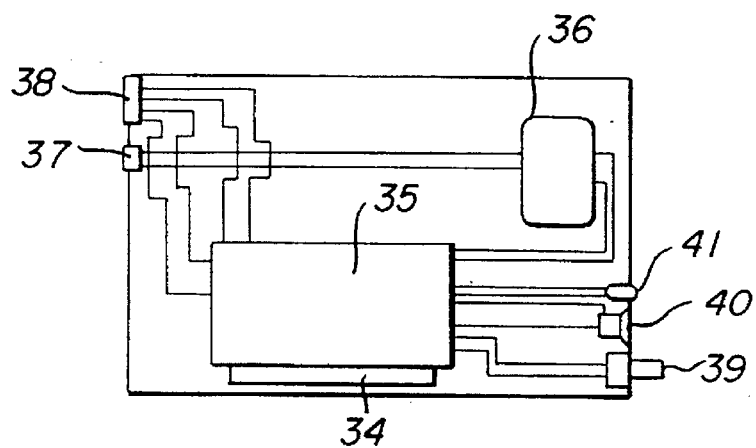
FIG. 6 illustrates the audio circuit module that fits in the space for the 3.5 inch floppy drive on the IBM 750c.

To facilitate the installation of the piezoelectric speaker system the electronics were placed in a modular box that fits in the space for the 3.5 inch floppy drive of the IBM 750c. This modular box is illustrated in FIG. 6. A metal heat sink 34 is applied to the linear amplifier circuit 35, specifically, directly to the op-amp package. The transformer 36 is also mounted in the box with epoxy. An electrical connector 37, for the output audio signal to the piezoelectric elements is mounted on the rear of the module. A four conductor connector 38 is also installed for the audio input from the computer and the system power (taken from the battery pack). The front of the module includes a push button switch 39 for power, a 3.5 mm input jack 40 for external audio input, and a light emitting diode (LED) 41 to indicate when the audio unit is powered. The circuitry is then potted with a thermal conductive epoxy (Emerson and Cummins STY-CAST™ 2850FT Epoxy and Catalyst 24LV, commercially available), to dissipate the heat from the power op-amps over the entire module. Potted in this manner the module is only slightly warm to the touch even after several hours of operation.

Figure 7:
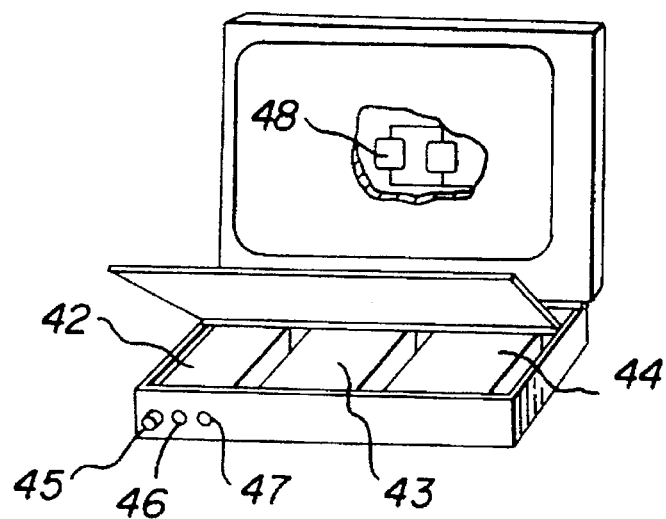
FIG. 7 illustrates the location of the piezoelectric patches and the audio module in the IBM 750c.

FIG. 7 illustrates the installation of the audio amplifier in the IBM 750c. The module 42 is placed in the space normally occupied by the 3.5 inch floppy drive. The battery 43 and hard drive 44 are also shown. The power button 45, 3.5 mm jack receptacle 46, and the light emitting diode 43 are on the front of the laptop. The locations of the piezoelectric elements 48 are also shown for completeness.

Figure 8:
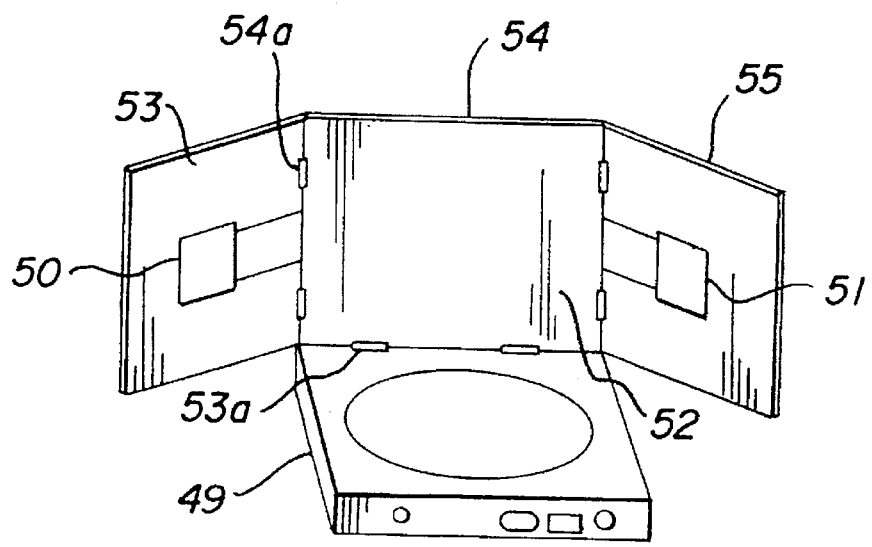
FIG. 8 is a drawing of a compact disc player with piezo patches.

As discussed earlier, compact disc players require the use of headphones or amplified speakers that must be carried separately. The application of piezoelectrics to a compact disc player as illustrated in FIG. 8 eliminates this problem. The compact disc player 49 is equipped with piezoelectric elements 50, 51 as shown. The piezoelectric elements 50, 51 are mounted to the lid 52 that unfolds into three sections 53, 54, and 55. The piezoelectric elements 50, 51 are mounted to the left and right side section 53, 55 respectively. Sections 53, 54 and 55 are hinged as at 53a and 54a in a friction fit to allow the sections to maintain whatever position they are placed in but be readily foldable when not in use. Piezos on opposing sections allow for equalization.

Figure 9:
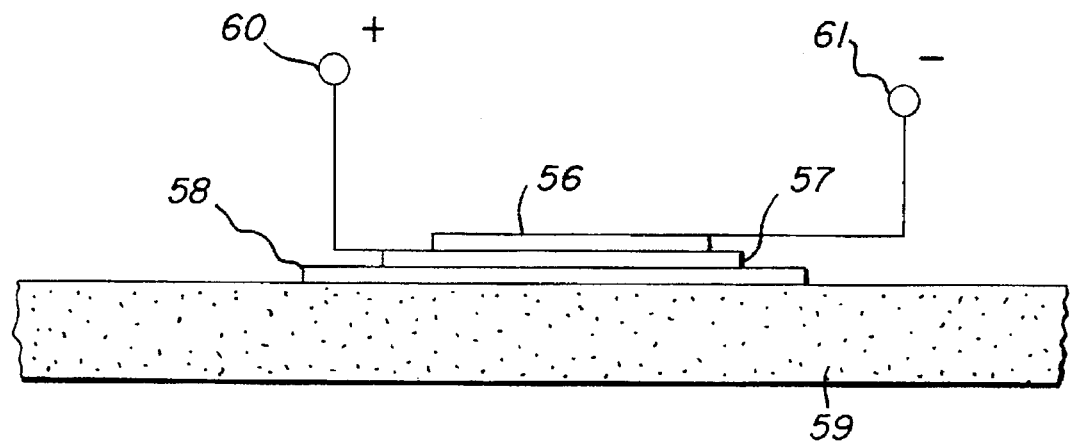
FIG. 9 is a drawing of the application of a piezoelectric to light weight foam.

The applications of piezoelectric elements to light weight foam produce a speaker with better low frequency responses. It also allows for unique applications. FIG. 9 illustrates the application of a piezoelectric element 56 to two thin plastic panels 57, 58 that act as an impedance transition from the piezoelectric element to the light weight foam 59. The positive and negative terminals 60, 61 are shown for completeness.

Figure 10:
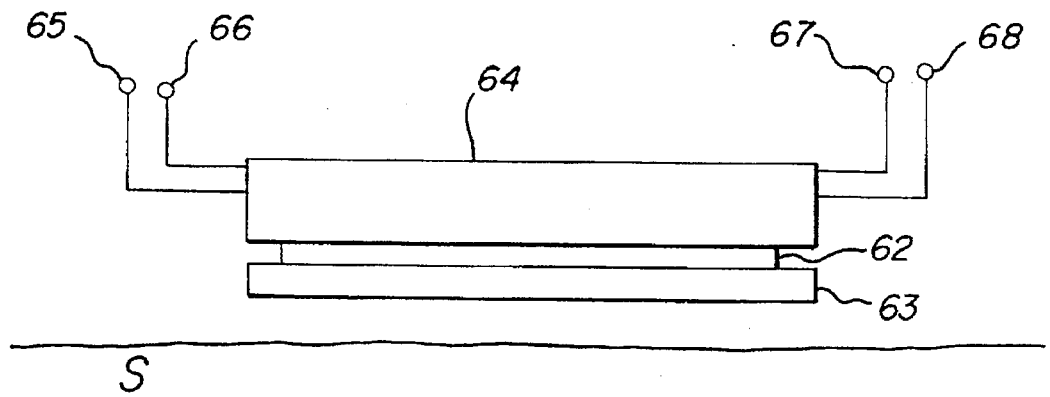
FIG. 10 is a drawing of the retrofit kit that can be applied to any surface to create a piezoelectric speaker system.

FIG. 10 illustrates the construction of a piezoelectric system that can be mounted to flat surfaces to form a speaker. The piezoelectric element 62 is mounted to its own damping material 63. An audio circuit module 64 is mounted on the back of the piezoelectric element 62. The positive and negative power terminals 65, 66 and the positive and negative audio signal terminals 68, 69 extend from the audio circuit module 64. This module is similar to the one in FIG. 6. This unit is used in quick retrofit type applications where little effort or time is available for installation.

Figure 11:
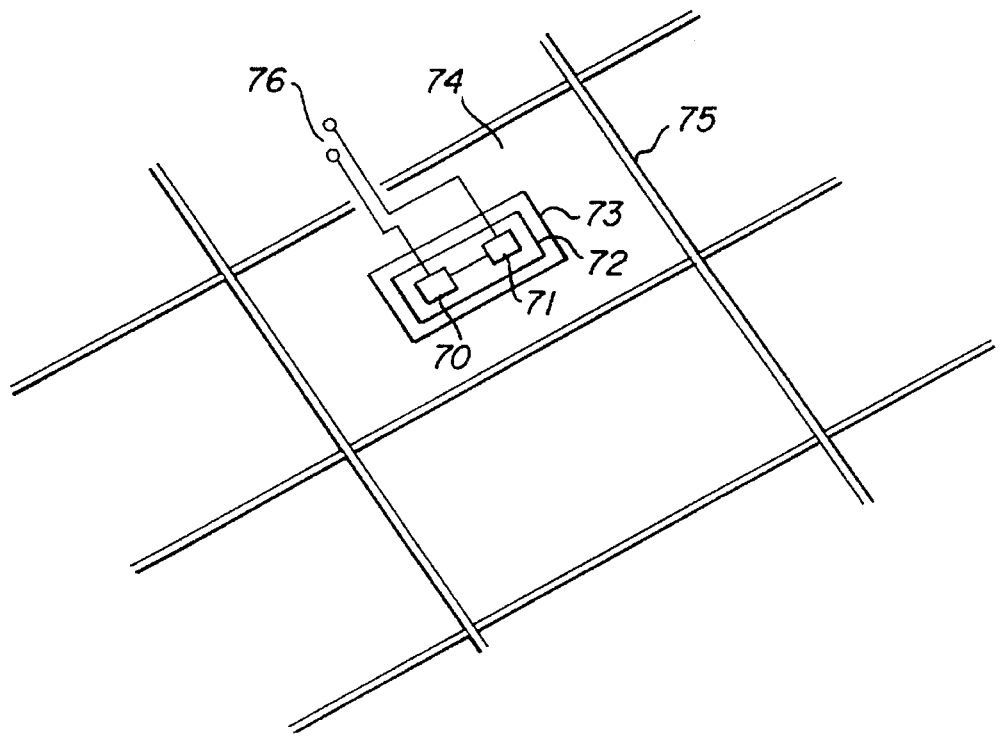
FIG. 11 illustrates the application of a light weight piezoelectric speaker in a ceiling tile.

FIG. 11 illustrates the application of the piezoelectric foam speaker of FIG. 9 as a ceiling tile. Two piezoelectric elements 70, 71 connected in parallel are mounted to a thin piece of plastic 72, which is mounted to a slightly larger piece of plastic 73 that forms a transition to the foam ceiling tile 74. The tile is then placed in the framework 75 of the ceiling like the other panels. The panel is then driven via the audio signal terminal 76 from a remote audio amplifier. The view in FIG. 11 is obviously from above the ceiling. Occupants of the space beneath would not see the elements.

Figure 12:
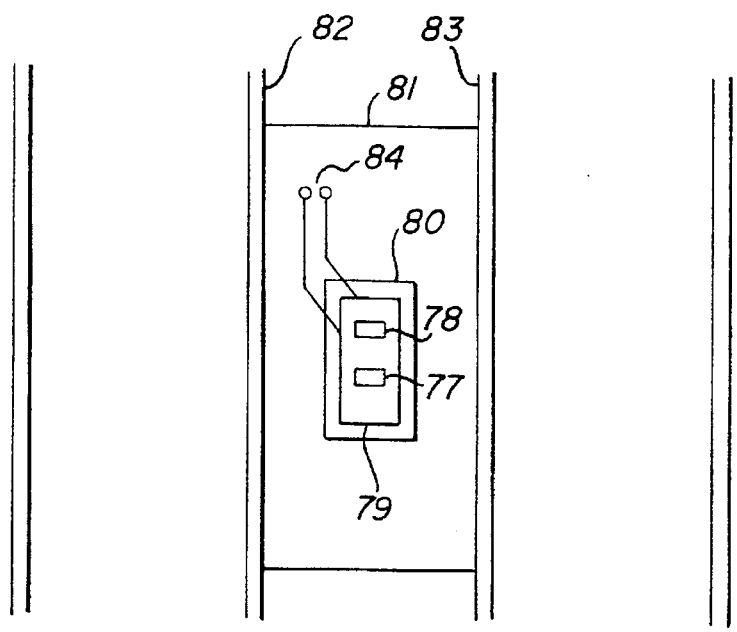
FIG. 12 illustrates the application of a light weight piezoelectric speaker in a wall panel.

FIG. 12 illustrates a similar application for wall paneling. Again, two piezoelectric elements 77, 78 connected in parallel are mounted to a thin piece of plastic 79, which is mounted to a slightly larger piece of plastic 80 that forms a transition to the wall panel 81 which is bonded to the wall material 81 which can be drywall gypsum board or the equivalent. The wall panel is then placed between the wall studs 82, 83 like the other pieces of wall paneling. The panel is then driven via the audio signal terminal 84 from a remote audio amplifier.

Figure 13:
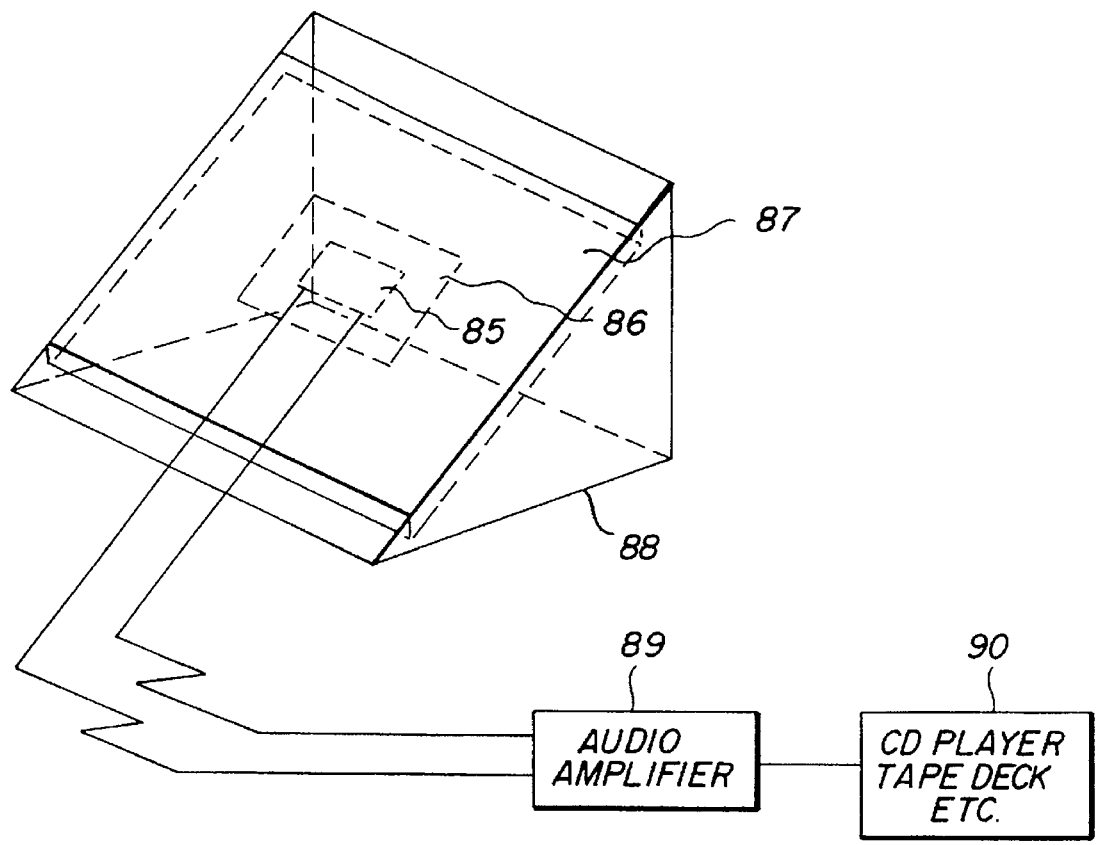
FIG. 13 illustrates the application of a foam speaker with a back enclosure.

FIG. 13 illustrates the foam panel speaker back with an enclosure. A piezoelectric element 85 is placed on a thin piece of plastic 86, which is used to drive the foam panel 87 to which it is secured. The foam panel 87 is slightly undersized compared to enclosure 88 to provide a path for pressure waves generated by the backside of the foam panel. The enclosure 88 can be made from any rigid material. The panel is driven remotely by an audio amplifier 89 like the one in FIG. 2. A CD player or tape deck 90 is used to provide the audio signal.

Figure 15:
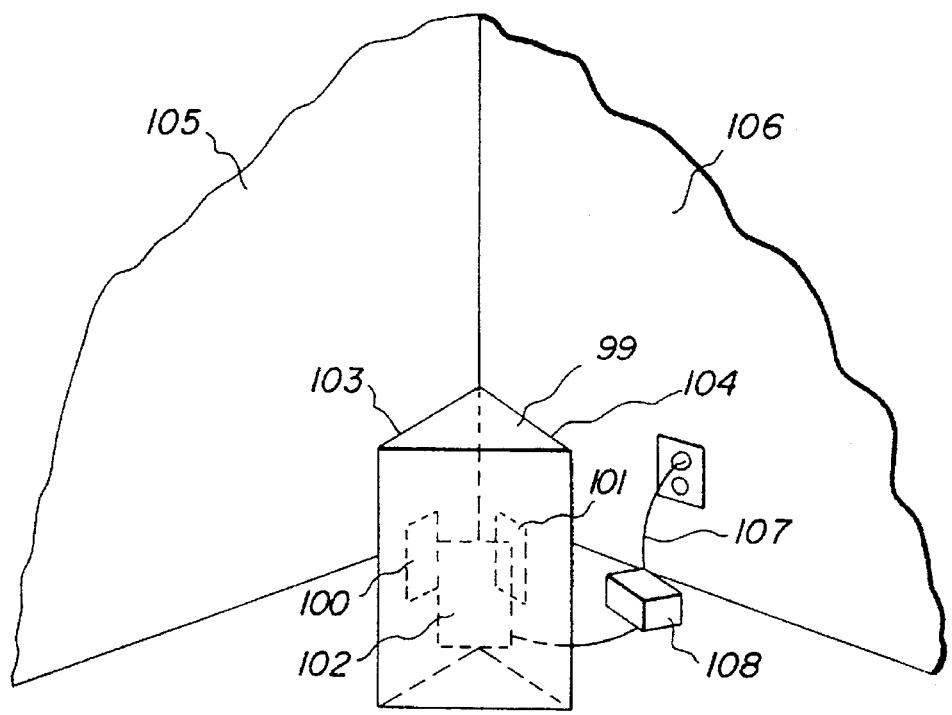
FIG. 15 illustrates the application of a dual channel speaker box that use the walls of a room near a corner to achieve stereo separation.
Figure 14:
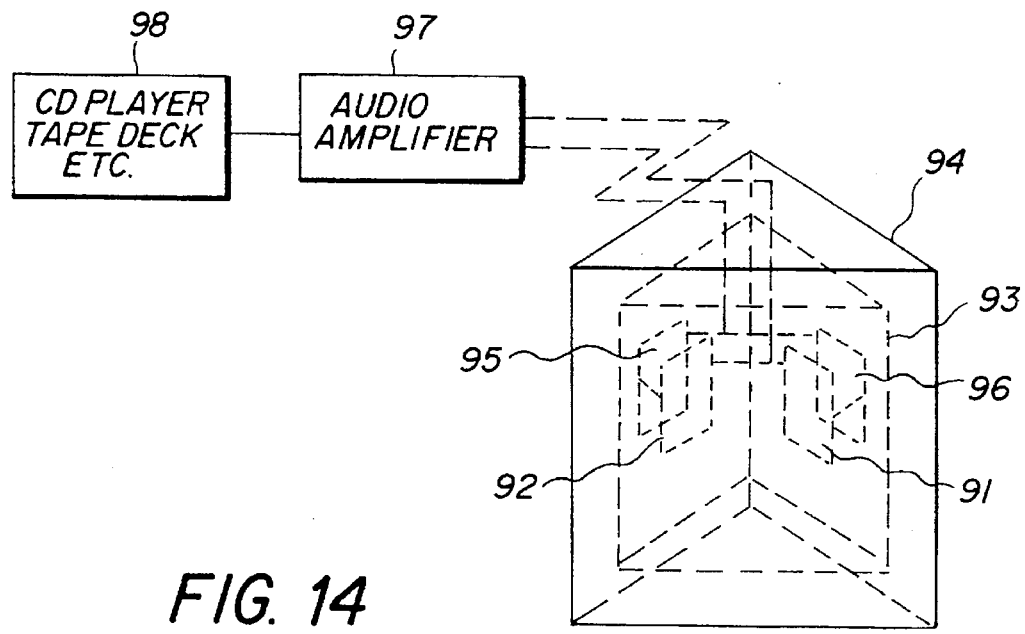
FIG. 14 illustrates the application of piezoelectric patches to two plastic boxes, one placed inside the other. This forms a resonator to enhance low-mid range performance.

FIG. 14 illustrates another embodiment of the present invention. Piezeoelectric elements 91, 92 are placed on the sides of a triangular box 93 roughly 6 inches high and 4 inches wide. This box is placed inside a larger box 94 that is roughly 8 inches high and 6 inches wide. Piezoelectric elements 95, 96 are placed on the sides of the larger triangular box 94. Both triangular boxes are made from ⅜" pieces of ABS. The placement of the smaller box inside the larger one creates a resonant cavity that provides improved low frequency performance. The boxes are left open on the bottom and can be placed on stand offs to allow air flow in and out of the boxes. The height of one box relative to the other can be adjusted to change the acoustics of the system. The piezoelectric elements 91, 92, 95 and 96 are connected in parallel, and driven by an audio amplifier 97 similar to the one in FIG. 2. Again, a CD player or tape deck 98 is used to provide the audio signal. FIG. 15 illustrates the application of a dual channel speaker box that uses the walls of a room near a corner to achieve stereo separation. The triangular shaped box 99 has piezoelectric elements 100, 101 on two sides. The third side is used to support a dual channel amplifier 102, which is essentially two audio circuits as in FIG. 2, the difference being that the two audio inputs are not summed, but are instead fed into separate audio amplifiers. The sides 103, 104 radiate a pressure wave toward the walls 105, 106. This radiation is then spread out as it is reflected from the walls 105, 106. Because the sides 103, 104 of the box are at a 90 degree angle, and the vibration from the piezoelectric elements is predominantly tangential to the sides of the box, little couplings exist between the two sides 103, 104. The unit should be placed close to the corner and can be powered via cord 107 with an AC adapter 108.

Figure 16:
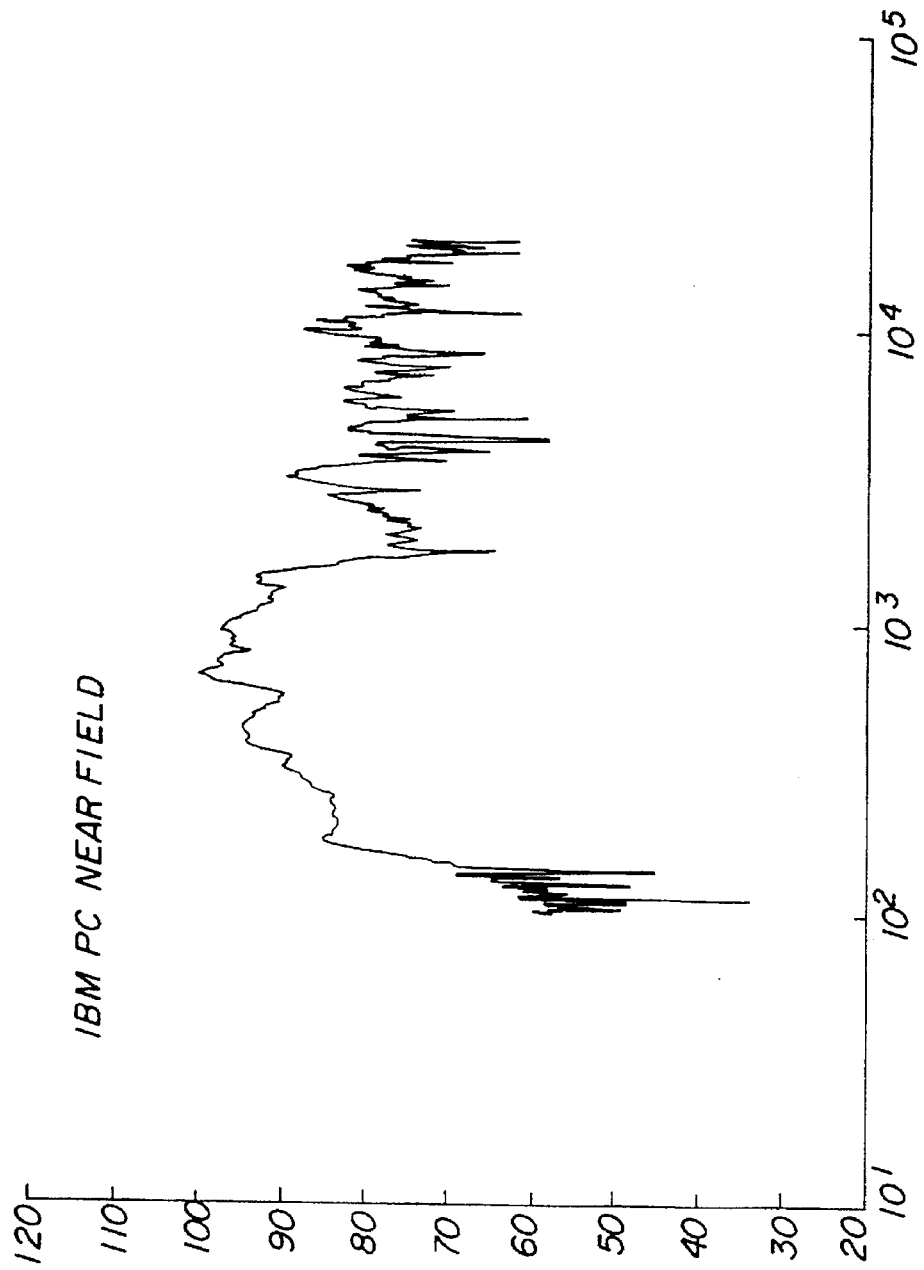
FIG. 16 is a plot of the near field frequency response of modified IBM 750c.

The results of providing the unique piezos as speakers in the embodiments of this invention were placed with the following results. FIG. 16 is a plot of the near field frequency response of an IBM 750c modified in accordance with the teachings of this invention. The near field data indicates a reasonably strong response from 200 Hz to 1800 Hz with an average sound pressure level of approximately 90 dB with a variation of plus or minus 6 dB. Above 1800 Hz the average sound pressure level dropped to approximately 75 dB with a variation plus or minus 5 dB.

Figure 17:
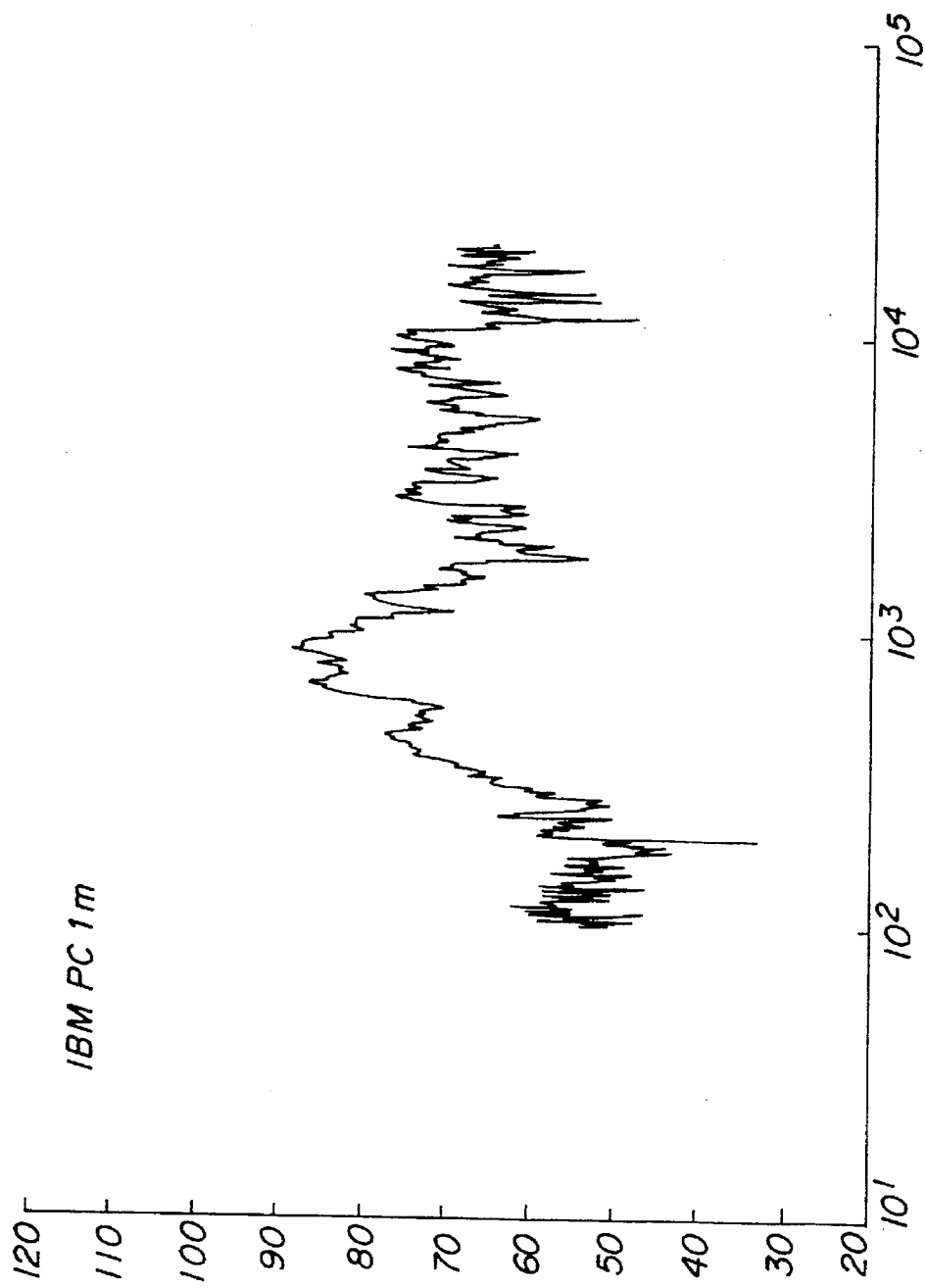
FIG. 17 is a plot of the far field frequency response of modified IBM 750c at 1 meter.

FIG. 17 is a plot of the far field frequency response of an IBM 750c modified in accordance with the teachings of this invention at 1 meter. This data indicates a considerable drop in the response below 380 Hz. The response from 380 to 1800 Hz is roughly 75 dB with a variation of plus or minus 6 dB. Above 1800 Hz the average sound pressure level dropped to approximately 65 dB with a variation of plus or minus 10 dB.

Figure 18:
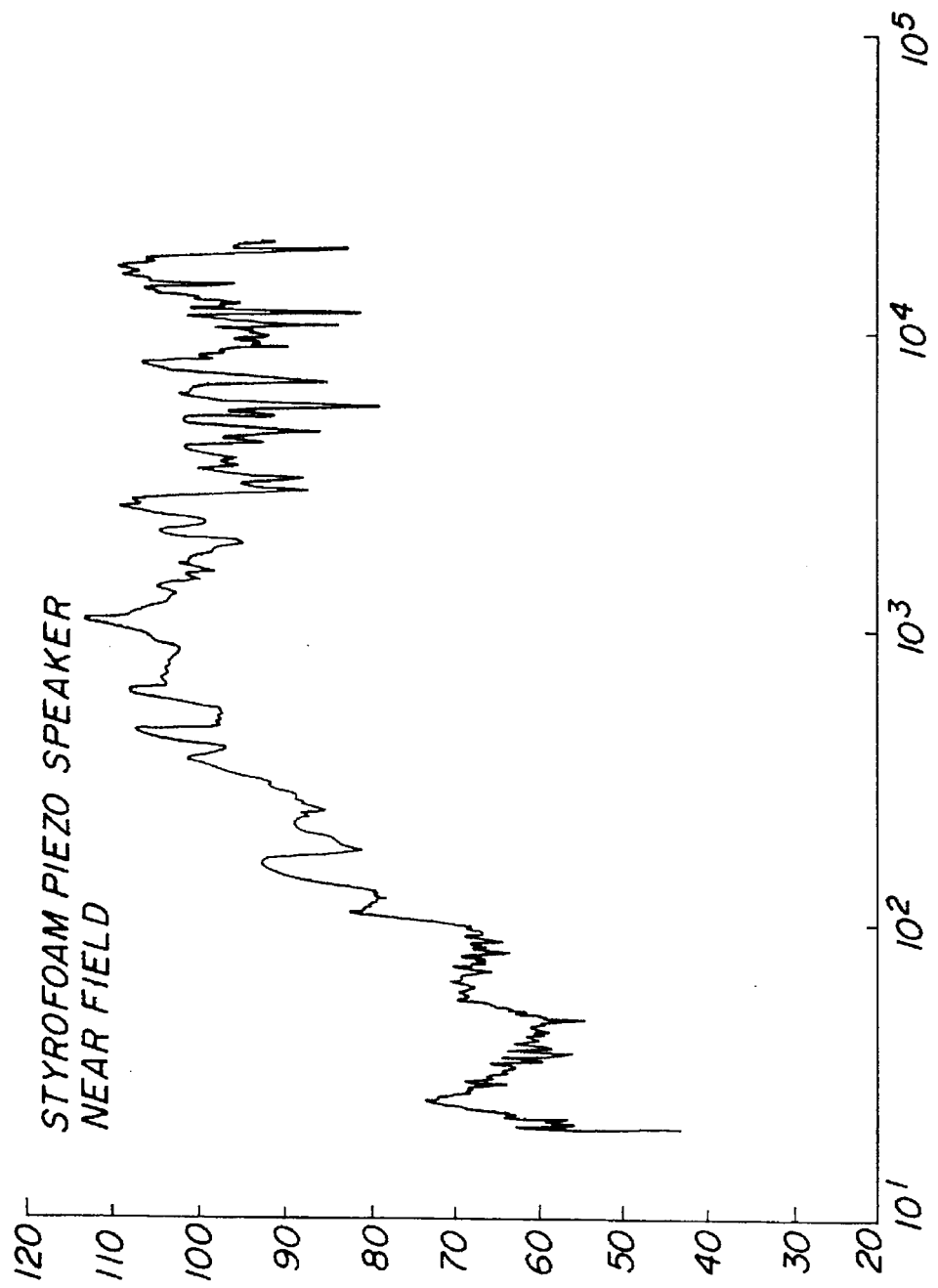
FIG. 18 is a plot of the near field frequency response of the foam panel speaker from FIG. 12.

FIG. 18 is a plot of the near field frequency response of the foam panel speaker of FIG. 12. This data indicates considerable improvement in low frequency response as compared to the laptop, but with a very nonlinear response below 200 Hz.

Figure 19:
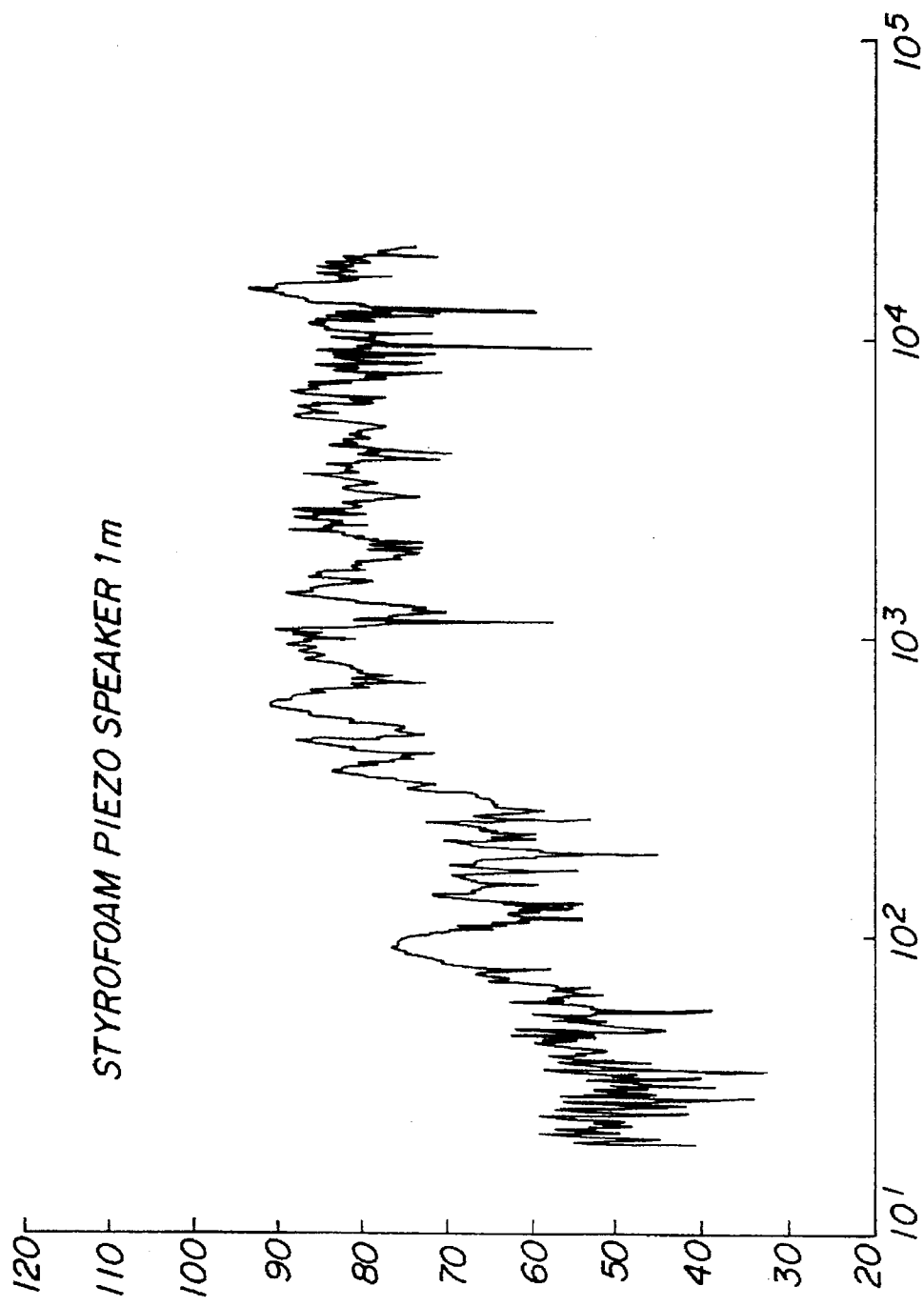
FIG. 19 is a plot of the frequency response of the foam panel speaker from FIG. 12 at 1 meter.

FIG. 19 is a plot of the frequency response of the foam panel speaker of FIG. 12 at 1 meter. This data indicates a reasonably flat frequency and strong response above 300 Hz of about 80 dB with about 5–10 dB of variation.

Having described the invention attention is directed to the claims.

We claim:

1. A laptop personal computer having piezo speakers, said computer comprising a modular base containing power means, an audio amplifier means and a hard drive means, a hollow lid hinged along one edge to said modular base, display means affixed to said lid and adapted to display information from said hard drive, and piezo plate members affixed within an inner surface of said hollow lid means and connected to audio amplifier means to form, in combination with said lid means, a loudspeaker that provides acoustic sounds from said amplifier audio signals.

2. A computer as in claim 1 wherein said audio amplifier means includes a linear amplifier and a transformer.

3. A computer as in claim 2 wherein said transformer is a 17 to 1 step transformer.

4. A computer as in claim 2 wherein said audio amplifier means contains two power op-amplifiers.

5. A computer as in claim 2 wherein said audio amplifier means is monaural and includes a jack means for receiving and summing stereo input signals.

6. A computer as in claim 1 wherein the location of the piezos within the lid are optimized to improve the acoustic quality of the case.

7. A computer as in claim 6 and including damping material added to said piezos to minimize objectionable resonance in said lid.

8. A computer as in claim 6 and including stiffening means affixed to said lid to aid in minimizing resonance in said lid.

9. A computer as in claim 8 wherein said stiffening means comprises woven fiberglass epoxy board.

10. A computer as in claim 1 wherein said audio amplifier means includes a linear amplifier circuit including a heat sink means.

11. A computer as in claim 10 wherein both said linear amplifier circuit and said heat sink is polled with a thermal conductive epoxy.

12. A compact disc player, said player having a base member with an amplifier circuit and a playing means for playing a compact disc, the improvement comprising a lid means on said player and hinged to said base member, and piezo speakers mounted to said lid means to form a loudspeaker that provides acoustic sound in response to audio signals from said amplifier circuit, wherein said lid means is formed of three sections, a first section having four sides and being rectangular, and being hinged to said base member along one edge, a second and third section of rectangular configuration and being hinged on opposite edges of said first section and being adapted to fold up along with said first section onto said base member, said second and third sections having flat piezo speakers mounted thereon.

13. A triangular box speaker, said speaker comprising a triangular box having a large side surface and two smaller side surfaces at approximately 90 degrees to one another, piezo patches mounted on said two smaller side surfaces and being smaller than said surfaces, a smaller triangular box located within said larger box and having surfaces coextensive with said larger box surfaces, piezo patches mounted on the two smaller surfaces of said smaller box opposite the larger box piezo patches, whereby said smaller box is located within said larger box to create a resonate cavity when said piezo patches are supplied with audio signals.

14. A speaker as in claim 13 wherein said piezo patches are connected in parallel.

15. A method of optimizing the acoustic quality of a case with a wall containing a piezo element, said method comprising (1) applying a piezo element to a wall of said case whereby the piezo element and the wall form, in combination, a loudspeaker, (2) driving the piezo element with a sine sweep to determine whether objectionable resonance exists, (3) applying damping material to said case to minimize said resonance and tightening any vibrating elements in said case, (4) driving the piezo element with a sine sweep to ascertain if objectionable resonance remains.

16. A method as in claim 15 including repeating steps (2) and (4) until no resonance is detected.

17. A method as in claim 15 including (5) applying stiffening material to the wall of said case, and (6) driving said piezo with a sine sweep to ascertain whether objectionable resonance remains.

18. A method as in claim 17 including repeating steps (5) and (6) until no resonance is detected.

* * * * *